May 22, 1956     J. R. WOOD     2,746,312
NONUNIFORM SPEED DRIVE MECHANISM
Filed Oct. 8, 1952     7 Sheets-Sheet 1

INVENTOR.
JAMES R. WOOD
BY Hudson, Boughton,
Williams, David & Hoffmann
ATTORNEYS May 22, 1956  J. R. WOOD  2,746,312
NONUNIFORM SPEED DRIVE MECHANISM
Filed Oct. 8, 1952  7 Sheets-Sheet 2

INVENTOR.
JAMES R. WOOD
BY Hudson Boughton,
Williams, David & Hoffmann
ATTORNEYS May 22, 1956 J. R. WOOD 2,746,312
NONUNIFORM SPEED DRIVE MECHANISM
Filed Oct. 8, 1952 7 Sheets-Sheet 5

INVENTOR.
JAMES R. WOOD
BY Hudson, Coughton,
Williams, David & Hoffmann
ATTORNEYS May 22, 1956  J. R. WOOD  2,746,312
NONUNIFORM SPEED DRIVE MECHANISM
Filed Oct. 8, 1952  7 Sheets-Sheet 6

INVENTOR.
JAMES R. WOOD
BY Hudson, Boughton,
Williams, David & Hoffmann.
ATTORNEYS May 22, 1956  J. R. WOOD  2,746,312
NONUNIFORM SPEED DRIVE MECHANISM
Filed Oct. 8, 1952  7 Sheets-Sheet 7

INVENTOR.
JAMES R. WOOD
BY Hudson, Boughton,
Williams, David & Hoffmann.
ATTORNEYS – # United States Patent Office 2,746,312
Patented May 22, 1956

2,746,312

NONUNIFORM SPEED DRIVE MECHANISM

James R. Wood, Cleveland, Ohio, assignor to Harris-Seybold Company, Cleveland, Ohio, a corporation of Delaware Application October 8, 1952, Serial No. 313,722

11 Claims. (Cl. 74—393)

This invention relates to improvements in non-uniform speed drive mechanism, that is to say a drive in which the driven member in each cycle has one or more constant speed periods and periods in which the rate of rotation accelerates from a lower speed to a higher speed and decelerates from a high speed to a lower speed.

The invention as disclosed herein is applied to the case in which the driven element has one constant high speed period and one constant low speed period with periods of acceleration and deceleration between the constant speed periods. The invention may be applied however to drives in which there are more than two constant speed periods, with a corresponding number of acceleration and deceleration periods.

One of the objects of the invention is the provision of a drive of the character stated in which the transitions from higher to lower or from lower to higher speeds shall be carried out smoothly and with a minimum of jar or strain upon the mechanism.

Another object is the provision of mechanism in which the acceleration from low speed to high speed is effected with economy of power.

Other objects and features of novelty will appear as I proceed with the description of those embodiments of the invention which, for the purposes of the present application, I have illustrated in the accompanying drawings, in which Fig. 1 is a side elevational view of drive mechanism carried by parallel shafts for imparting two different constant speed periods to the driven shaft, wherein the low speed constant rotation of the driven shaft is ending and the acceleration period is beginning.

Figure 1:
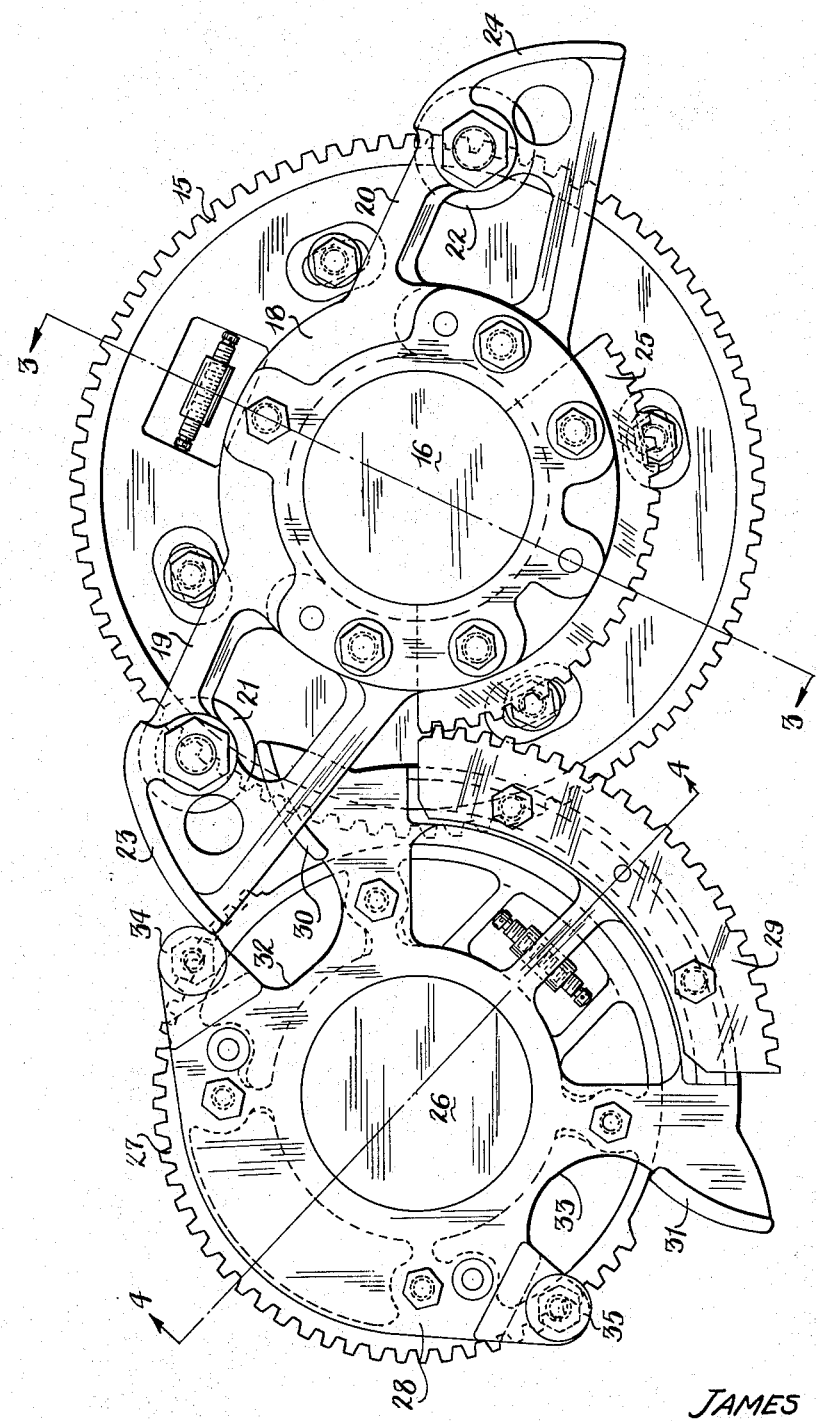
Figure 2:
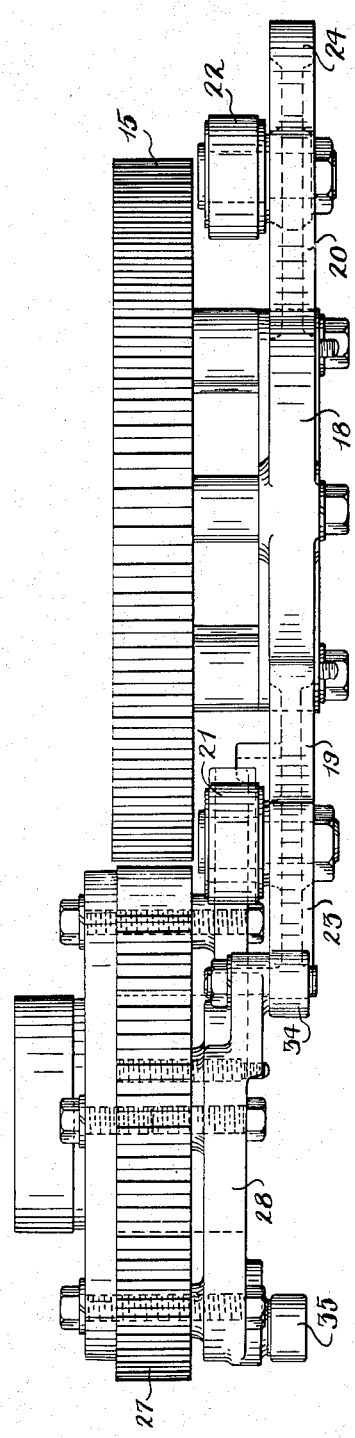
Fig. 2 is a view in the nature of a plan view of the mechanism of Fig. 1.
Figure 9:
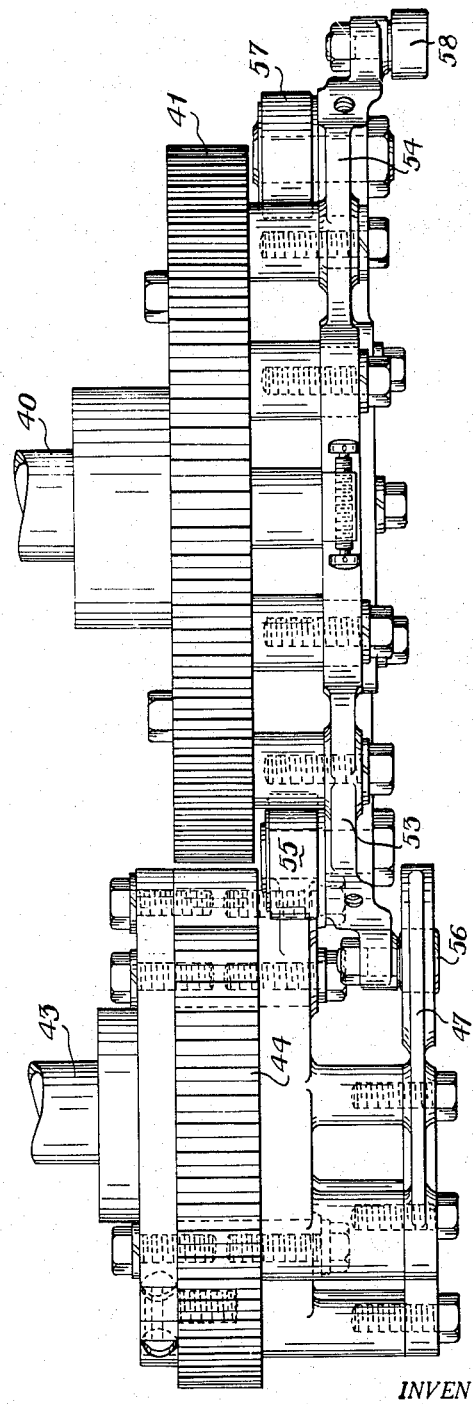
Fig. 9 is a view in the nature of a plan view of the mechanism shown in Fig. 8.
Figure 8:
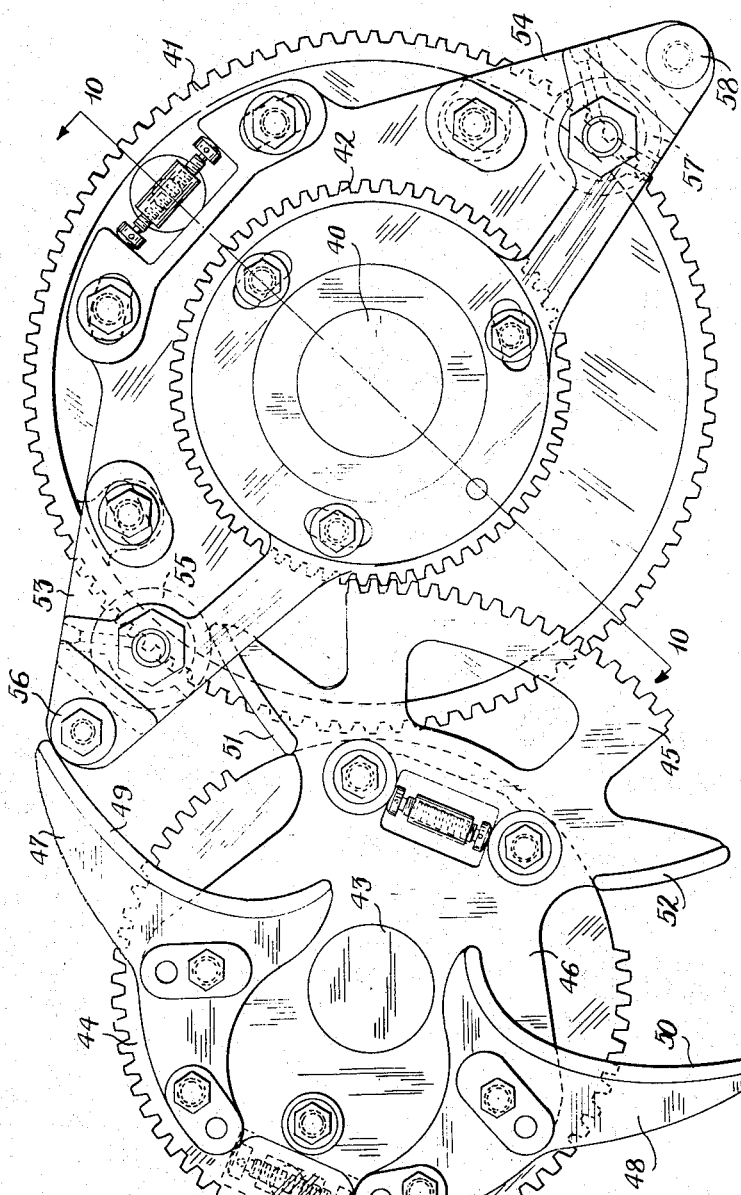
Fig. 8 is a view similar to Fig. 1, but showing a modified form of the invention.

The forms of the invention illustrated in Figs. 1 and 8 have been designed for use especially on printing machines for imparting variable speed rotation to a feed cylinder that is employed to take sheets travelling at low speed to facilitate accurately registering them against stops on the cylinder, then accelerating them to the speed of the impression cylinder and transferring them to that cylinder while the two cylinders rotate at the same surface speed, and then decelerating the feed cylinder and driving it at a continuous low speed during which period the next sheet is taken and registered. However the invention is adapted for use in various other connections as previously stated.

In Fig. 1, 15 is a circular gear on a drive shaft 16. It may receive power in any convenient way as from a pinion 17. Fixed on shaft 16 there is also a bracket 18 which carries two oppositely extending arms 19 and 20. On arm 19 there is rotatably mounted a roller 21, and a similar roller 22 is rotatably mounted on arm 20. These arms also carry cams 23 and 24 of similar contour, the external surfaces of these cams being the active surfaces. Bracket 18 also has attached thereto a gear sector 25 which is offset from gear member 15 longitudinally of shaft 16. In the embodiment illustrated arms 19, 20, cams 23, 24 and the sector 25 are symmetrical about the section line 3—3 of Fig. 1.

Shaft 26 is disposed parallel to shaft 16. It carries a gear sector 27 which is disposed in the same plane with gear member 15 and meshes with that gear during a part of each revolution. It also carries a bracket 28 to which is secured a gear sector 29 which is in the same plane with gear sector 25 and meshes with that sector during a part of each revolution. The two sectors 27 and 29 together occupy considerably less than a full circumference, preferably not more than 300°, and there is consequently a substantial spacing of the adjacent ends of the two sectors. In these spaces the bracket 28 carries two cams 30 and 31 which are in the same plane with rollers 21 and 22 and are engaged by those rollers at certain times in the cycle. Adjacent the cams 30 and 31 bracket 28 is cut away to form recesses 32 and 33. On the sides of the recesses opposite to the cams 30 and 31 the bracket 28 has journaled thereon two rollers 34 and 35 which are in the same plane with the cams 23 and 24. Roller 34 runs upon cam 23 at the same time that roller 21 runs upon cam 30, and likewise roller 35 runs upon cam 24 at the same time that roller 22 runs upon cam 31. The gear sectors 27 and 29, the cams 30 and 31 and the rollers 34 and 35 are symmetrically positioned about the section line 4—4 of Fig. 1.

Operation.—Shaft 16 along with gear 15 and sector 25 turn at a constant speed. They drive sectors 27 and 29 and thus shaft 26 at two different constant speeds in each revolution, and the cooperating cam and roller means effects acceleration and deceleration of driven shaft 26 following the slow constant speed and high constant speed motions respectively.

In Fig. 1 the direction of rotation of drive shaft 16 is counterclockwise as indicated by the arrow. Sector 25 is just leaving sector 29, which means that the low speed operation of shaft 26 is just terminating. Accelerating roller 21 is just beginning to contact cam 30 and roller 34 is beginning to contact cam 23. As the rotation of shaft 16 continues roller 21 rides down the upper or inner surface of cam 30, the cam being so designed that the roller 21 gradually accelerates shaft 26 from the constant low speed imparted by sector 25 until the center of roller 21 reaches the line of centers of shafts 16 and 26, see Fig. 5, at which time the surface speed of sector 27 will be the same as that of gear member 15 and the two gears will come into mesh.

It will be noted that when this occurs roller 21 will extend into recess 32 in bracket 28. Roller 21 and cam 30 will now part company, and the high speed constant rotation of shaft 26 will begin. Recess 32 accommodates roller 21 for a portion of the cycle at the end of the acceleration period and for a short time following the acceleration period. During the acceleration period roller 34 will travel along the outer surface of cam 23 from the position of Fig. 1 to that of Fig. 5, the function of this engagement being to hold roller 21 against cam 30 and prevent shaft 26 from overrunning, that is from traveling faster than the cam and roller actuating means causes it to travel.

Figure 5:
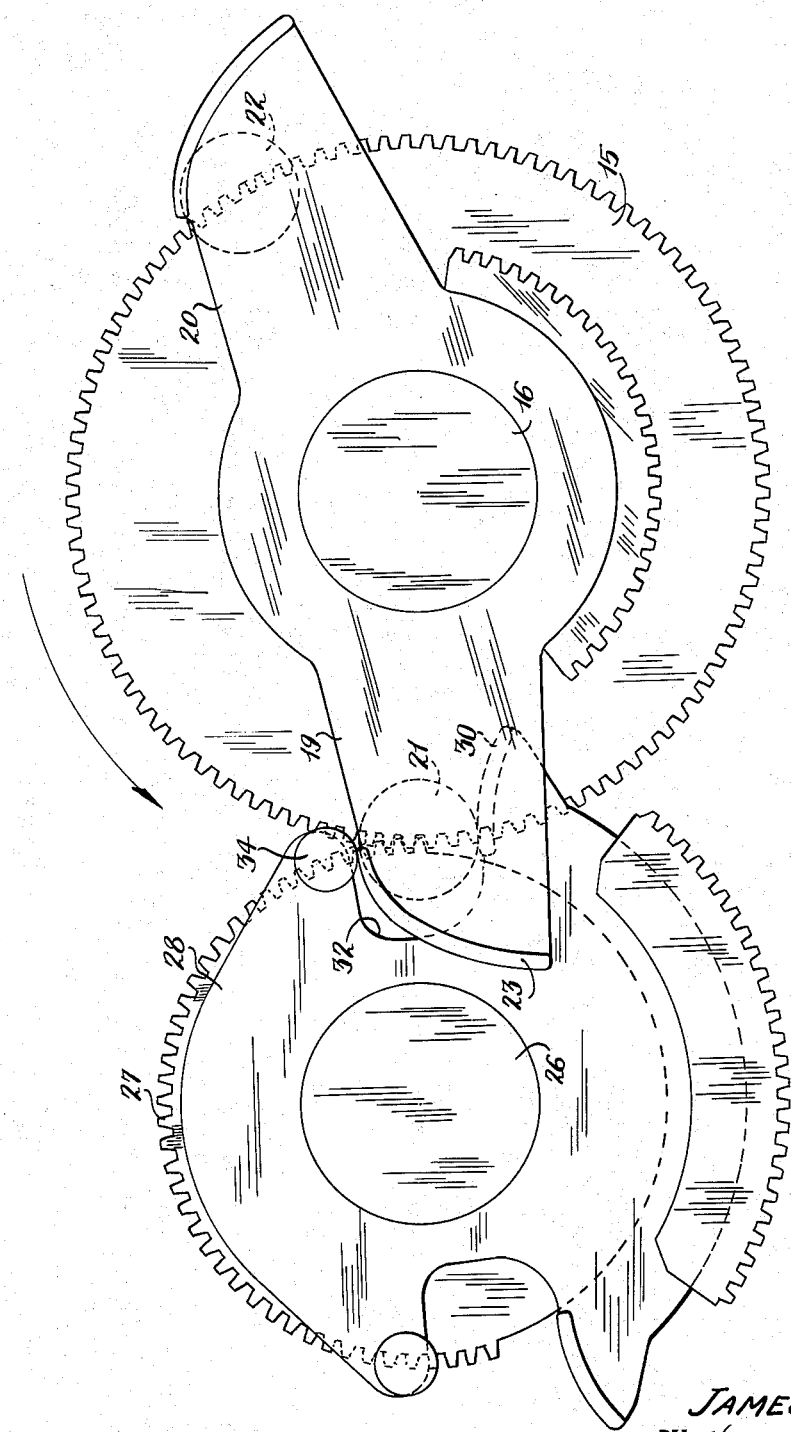
Fig. 5 is a diagrammatic view of the construction of Fig. 1 wherein the acceleration period is ending and the high constant speed period is beginning.
Figure 6:
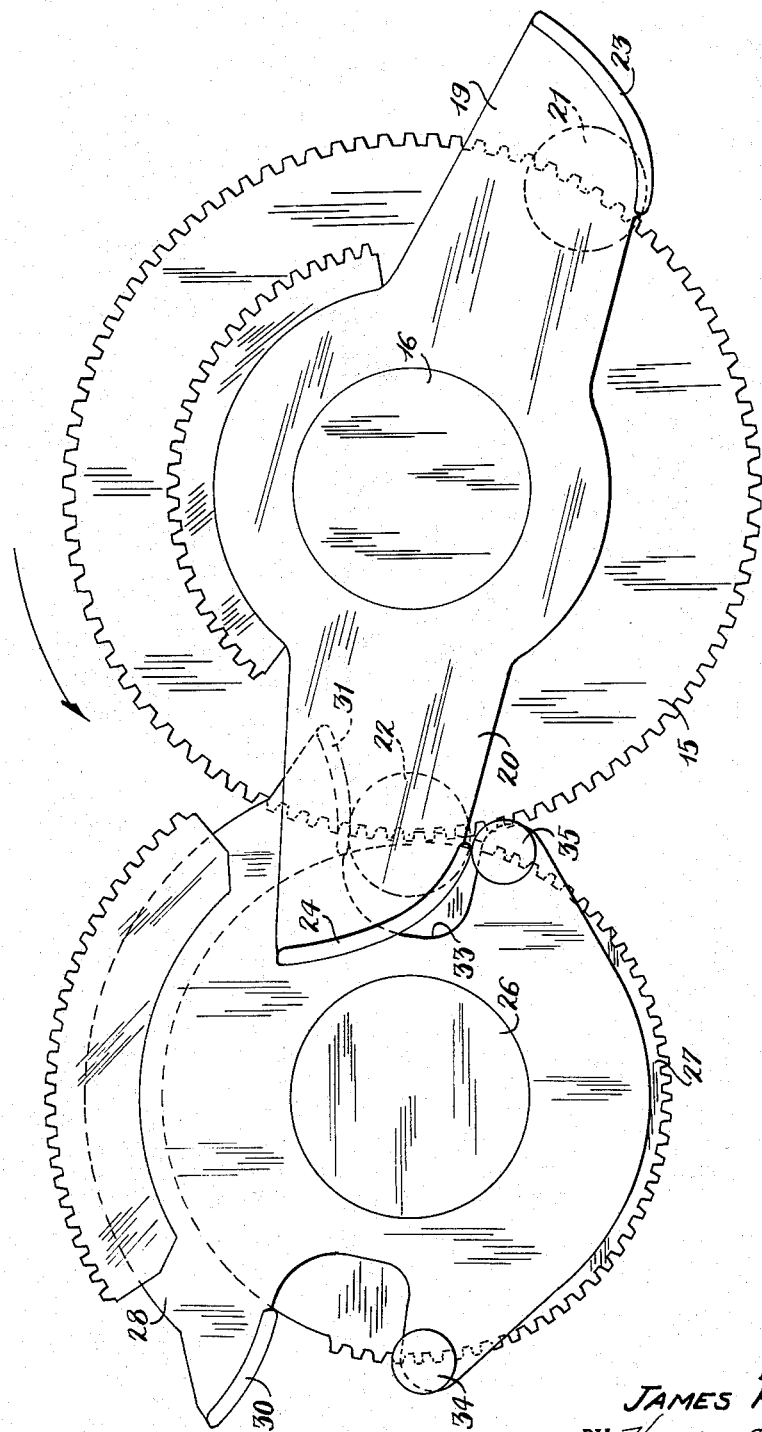
Fig. 6 is a similar view in which the parts of the mechanism are shown in the positions they occupy as the constant high speed period is ending and the decelerating period is beginning.

Beginning with the position of Fig. 5 the gear member 15 and the gear sector 27 are in mesh and the shaft 26 is driven at uniform high speed until the sector 27 moves out of mesh with gear member 15 at the point indicated in Fig. 6.

At this point cam 31 on bracket 28 has gone into engagement with roller 22 on arm 20. As the two shafts continue their rotation roller 22 runs outwardly on cam 31, which has the effect of gradually decelerating bracket 28 and shaft 26 upon which it is mounted. While this is occurring roller 35 runs to the left on the outer surface of cam 24. At the end of the deceleration motion illustrated in Fig. 7, roller 22 is on the point of leaving decelerating cam 31 and roller 35 is on the point of leaving cam 24, the purpose of the latter action being to hold roller 22 in engagement with cam 31 and prevent the deceleration motion from becoming too rapid or from going too far.

Figure 7:
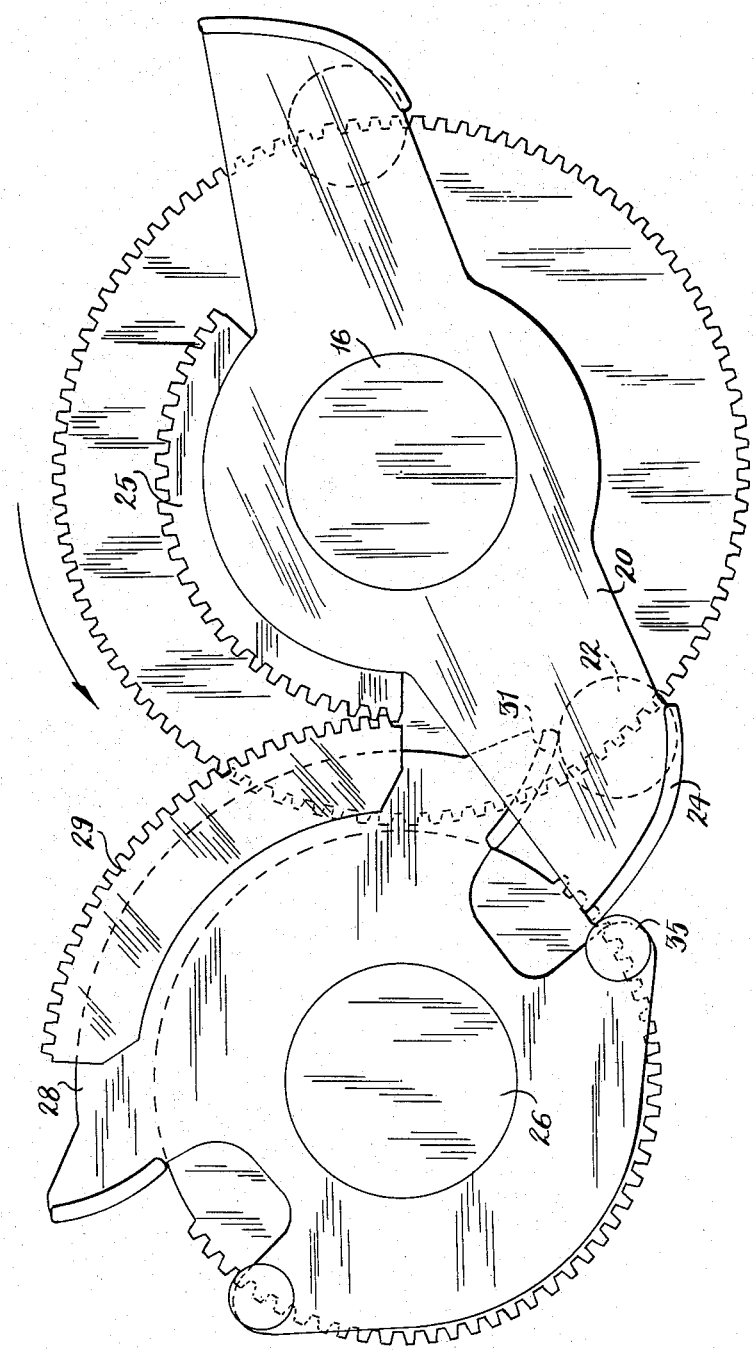
Fig. 7 is a similar view in which the decelerating period is ending and the slow speed constant travel is beginning.

Fig. 7 illustrates the beginning of the uniform low speed drive to shaft 26, the sectors 25 and 29 just going into mesh. This low speed motion continues until the parts again reach the position of Fig. 1, when the cycle begins over again.

Figure 3:
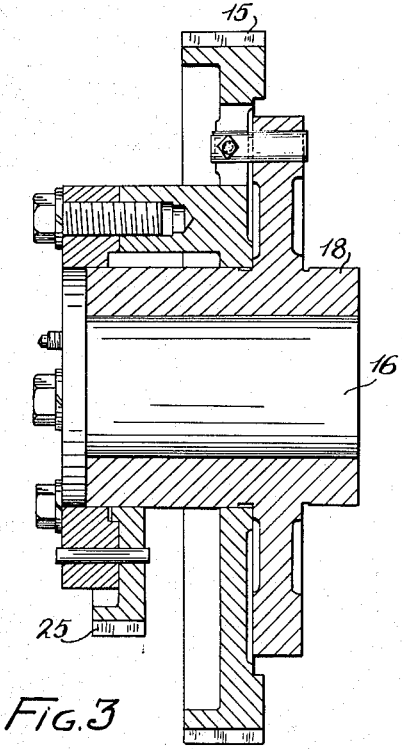
Fig. 3 is a sectional view taken substantially on the line 3—3 of Fig. 1.
Figure 4:
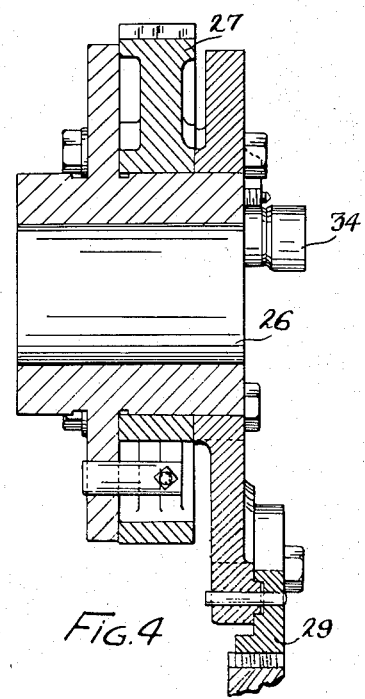
Fig. 4 is a further sectional view taken substantially on the line 4—4 of Fig. 1.
Figure 10:
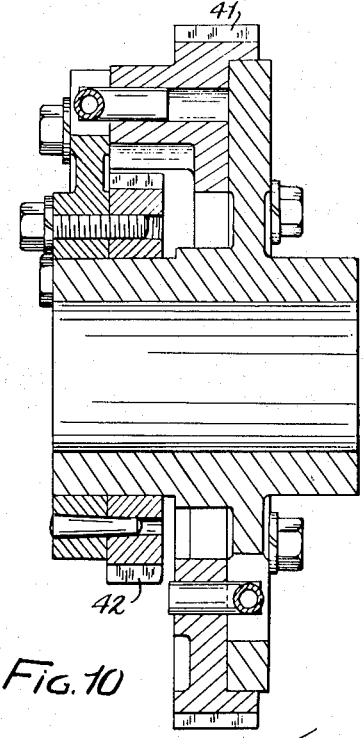
Fig. 10 is a cross-sectional view taken substantially on the line 10—10 of Fig. 8.

As will clearly appear from Figs. 3 and 4, there are two offset gear members on each shaft. On shaft 16 one of the gear members is a complete circular gear 15, while the other is a sector 25. The two gear members on shaft 26 are both sectors 29 and 27 respectively. While I consider this arrangement desirable it should be noted that in this regard it is essential only that in every pair of meshing gears one of the members be a sector. All four gear members could be sectors, there could be one circular gear and one sector on each shaft, or there could be two circular gears one shaft and two sectors on the other, and in the latter case the sectors could be on the drive shaft rather than on the driven shaft as herein shown.

In the embodiment illustrated in Fig. 1 the two sectors 27 and 29 are diametrically opposite, and between their adjacent ends the cams 30 and 31 are positioned where they function to accelerate and decelerate respectively when acted upon by rollers 21 and 22. The arcs of the two sectors 27 and 29 subtend a combined angle of not more than 300°, the remaining angle being required for the accelerating and decelerating periods. In the illustrated case the periods of acceleration and deceleration are equal, which however is not essential. Where these periods are equal, and where there is a sector on each of the shafts 16 and 26, both such sectors will be bisected by the plane through the axes of the shafts twice during each revolution of the shafts. Also, when the acceleration and deceleration periods are equal and two sectors are on the same shaft, as in the illustrated case, those sectors are disposed diametrically opposite and hence they too will be bisected twice for each revolution by the plane through the axes of the two shafts.

In the form of the invention illustrated in Fig. 8 the gear members on the drive shaft 40 are complete circular gears 41 and 42 offset from each other lengthwise of the shaft. The gear members on the driven shaft 43 are gear sectors 44 and 45, similarly offset and disposed so that sector 44 will mesh with gear 41 and sector 45 will mesh with gear 42. In this case, it will be observed, the difference in the angle of arc of sectors 44 and 45 is greater than in the case of sectors 27 and 29 of Fig. 1, which means that there will be a greater difference between the lengths of the periods of high speed and low speed of the driven shaft. In this figure also both sets of cams are on the same shaft and both sets of rollers on the other shaft. As shown in the drawings shaft 43 has a bracket 46 which carries the sector 45. To this bracket there are attached two supplemental brackets 47 and 48 having integral therewith cams 49 and 50 respectively. Bracket 46 in addition to the gear sector 45 carries the accelerating and decelerating cams 51 and 52.

On the shaft 40 there is mounted a bracket having opposed arms 53 and 54. Arm 53 has a roller 55 journaled thereupon which is adapted to run upon accelerating cam 51, and the same arm has another roller 56 which is adapted to run upon the internal surface of cam 49 whose purpose is primarily to maintain contact between cam 51 and roller 55. After the period of high speed operation, roller 57 on arm 54 comes into contact with the inner end of cam 52 and gradually rolls outwardly on the surface of that cam to slow down the rotation of driven shaft 43 preparatory to gear sector 45 coming into mesh with gear 42, whereupon the shaft 43 is driven at a uniform low speed during a small portion of a cycle, while a roller 58 on arm 54 engages cam surface 50 to hold the cam and roller means 57, 52 in engagement.

The illustrated embodiments are special cases. In its broader aspects the invention contemplates a construction in which the above mentioned symmetrical arrangements are not present, due to the fact that the acceleration and deceleration periods are unequal. Also contemplated is a construction in which there are more than two constant speed periods with a corresponding number of acceleration and deceleration peroids.

Having thus described my invention, I claim:

1. In combination, a drive shaft, a driven shaft, and means for continuously driving said driven shaft from said drive shaft at speeds above zero speed exclusively, comprising intermeshing gear members for turning said driven shaft at a constant speed during part of a revolution, one of said intermeshing members being a gear sector, cam and roller means on said driving and driven shafts for driving said driven shaft from said drive shaft functioning directly after a period of gear member engagement for decelerating said driven shaft to a lower rate of speed above zero speed, and other cam and roller means on said driving and driven shafts functioning directly in advance of said period of gear member engagement for accelerating said driven shaft from said lower speed to said constant speed.

2. In combination, a drive shaft, a driven shaft, and means for continuously driving said driven shaft from said drive shaft, comprising a plurality of gear members of different radius on one of said shafts angularly offset from each other, a plurality of similarly offset gear members of different radius on the other shaft respectively adapted to mesh with said gear members on said first named shaft, at least one member of each pair of intermeshing gear members being a gear sector, the gear members of different radius on said drive shaft imparting rotation of different rates of speed to said driven shaft, interengaging cam and roller means on said driving and driven shafts imparting deceleration to the driven shaft following a period of constant speed rotation and other cam and roller means on said driving and driven shafts imparting acceleration to the driven shaft following the other period of constant speed rotation.

3. A variable speed drive as defined in claim 2, wherein said periods of acceleration and deceleration are equal.

4. A variable speed drive as defined in claim 2, wherein one of said shafts has two gear members of long and short radius respectively angularly offset from each other and the other shaft has two similarly offset gear members of short and long radius respectively adapted to mesh with the said long and short radius gear members of said first named shaft, one member of each pair of intermeshing gear members being a gear sector, and wherein there are two sets of interengaging cam and roller means on said shafts, one for decelerating the driven shaft following its high speed rotation and the other for accelerating said driven shaft following its low speed rotation, and wherein the plane through the axes of the two shafts bisects both of said sectors simultaneously at two points in each revolution of the shafts.

5. A variable speed drive as defined in claim 4 characterized in that the two sets of gear members are in mesh during two separate periods the sum of which is not greater than 300° of arc of the driven shaft.

6. A variable speed drive as defined in claim 4, wherein both of the gear members of one of said shafts are gear sectors spaced apart circumferentially.

7. A variable speed drive as defined in claim 6, wherein both of said gear sectors are on the driven shaft.

8. A variable speed drive as defined in claim 2, wherein there is a gear sector of short radius on the driven shaft and a gear sector of short radius on the drive shaft.

9. A variable speed drive as defined in claim 2, characterized in that the rollers of the cam and roller means are on the drive shaft and the cams of said means are on the driven shaft.

10. A variable speed drive as defined in claim 2, comprising additional cam and roller means for holding the accelerating and decelerating cam and roller means in engagement.

11. A variable speed drive as defined in claim 10, wherein the accelerating and decelerating cam and roller means comprises rollers on the drive shaft and cams on the driven shaft and wherein said cam and roller means for holding the first named cam and roller means in engagement comprises rollers on the driven shaft and cams on the drive shaft.

References Cited in the file of this patent

UNITED STATES PATENTS

| | | |
|---|---|---|
| 1,142,051 | O'Connor | June 8, 1915 |
| 2,192,908 | Harrold et al. | Mar. 12, 1940 |
| 2,192,916 | Kaddeland et al. | Mar. 12, 1940 |

FOREIGN PATENTS

| | | |
|---|---|---|
| 82,598 | Germany | Aug. 8, 1895 |